United States Patent [19]
Watjer et al.

[11] Patent Number: 5,765,899
[45] Date of Patent: Jun. 16, 1998

[54] LOCKABLE SLIDING VISOR

[75] Inventors: Sheldon J. Watjer; Donald L. Sauer, both of Holland, Mich.

[73] Assignee: Prince Corporation, Holland, Mich.

[21] Appl. No.: 659,640

[22] Filed: Jun. 6, 1996

[51] Int. Cl.$^6$ ............................................. B60J 3/02
[52] U.S. Cl. ........................................ 296/97.11; 224/312
[58] Field of Search .......................... 296/97.1, 97.9, 296/97.11–97.13; 224/311, 312

[56] References Cited

U.S. PATENT DOCUMENTS

| | | |
|---|---|---|
| 1,808,086 | 6/1931 | Ulp . |
| 2,095,715 | 10/1937 | Rhein . |
| 2,201,348 | 5/1940 | Roberts . |
| 2,201,377 | 5/1940 | Schoenheit . |
| 2,207,668 | 7/1940 | Hudgings, Jr. . |
| 2,221,182 | 11/1940 | Davies . |
| 2,294,317 | 8/1942 | Pelcher et al. . |
| 2,322,898 | 6/1943 | Van Dresser . |
| 3,556,585 | 1/1971 | Binder . |
| 4,521,046 | 6/1985 | Foggini . |
| 4,582,356 | 4/1986 | Kaiser et al. . |
| 4,902,063 | 2/1990 | Crink ........................ 296/97.11 |
| 4,921,300 | 5/1990 | Lawassani et al. ........... 296/97.11 |
| 4,925,233 | 5/1990 | Clark ........................ 296/97.11 |
| 4,998,765 | 3/1991 | Van Order et al. ........... 296/97.11 |
| 5,026,108 | 6/1991 | Leahy ....................... 296/97.11 |
| 5,161,850 | 11/1992 | Redder et al. .............. 296/97.11 |
| 5,409,285 | 4/1995 | Snyder et al. .............. 296/97.11 |

FOREIGN PATENT DOCUMENTS

| | | | |
|---|---|---|---|
| 231440 | 8/1987 | European Pat. Off. ...... 296/97.11 |
| 3235997 | 3/1984 | Germany .................. 296/97.11 |
| 3324305 | 1/1985 | Germany .................. 296/97.11 |
| 5286363 | 11/1993 | Japan ..................... 296/97.11 |
| 2088299 | 6/1982 | United Kingdom . |

*Primary Examiner*—Dennis H. Pedder
*Attorney, Agent, or Firm*—Price, Heneveld, Cooper, DeWitt & Litton

[57] ABSTRACT

A visor includes a visor body receiving a longitudinally extending pivot rod to which there is fixedly mounted a generally U-shaped resilient clamp surrounding the pivot rod. A cam is coupled to the clamp and includes an actuating lever for selectively operating the clamp for releasing the pivot rod from the clamp allowing the visor body to slide longitudinally with respect to the pivot rod. In a preferred embodiment of the invention, the clamp is made of a resilient polymeric material having a cylindrical aperture adjacent its closed end for lockably receiving the pivot rod therein. Extending between the legs of the generally U-shaped clamp is an L-shaped cam rod having a flat extending between the legs such that they remain in a fully closed, clamped position while locking the visor body with respect to the pivot rod. The cam rod can be rotated by the actuation of a lever coupled thereto for spreading the legs of the U-shaped clamp apart for releasing the visor rod.

31 Claims, 6 Drawing Sheets

LOCKABLE SLIDING VISOR

BACKGROUND OF THE INVENTION

The present invention relates to a vehicle visor and particularly one which is adjustable along its longitudinal axis.

It has long been recognized that visors which are adjustable along the longitudinal axis of their pivot rod improves the visor performance by allowing the vehicle operator or passenger to adjust the visor's position to selectively block incident sunlight. U.S. Pat. No. 4,924,233, issued May 15, 1990, is representative of one of approach by which a visor is movable between a raised stored position along the front windshield to a lowered use position on either the front windshield or side window and slidable along the longitudinal axis of the visor for providing improved visor performance. With this and other sliding visor constructions, it is desirable to have a stable mount for the visor such that, as it is moved toward the end of the pivot rod, the visor remains stable and does not wobble. Further, it is desirable, although allowing the visor to be adjusted relatively easily by the operator, for the visor to remain in a longitudinally fixed position once the desired adjusted position is selected. These competing design criteria make it somewhat difficult to provide a longitudinally adjustable visor which can easily be moved and yet retain its adjusted position.

One dated solution to the later problem has been to provide a locking knob, as disclosed in U.S. Pat. No. 2,322,898, which can be loosened for adjusting the visor and tightened to lock the visor in a selected adjusted position. In order to operate such a device, however, it is necessary for the user to rotate the knob at least twice, once for unlocking the visor and secondly to lock the visor. Such a requirement would be extremely distracting while operating the vehicle and adjusting the visor as necessary due to directional changes in the vehicle and the incident sunlight changes. Also, such unsightly construction would be unacceptable for modern vehicle interior design. Accordingly, there exists a need for an adjustable visor which can be longitudinally adjusted along its pivot rod and locked into an adjusted position relatively easily without significant effort on the part of the operator and which is stable in all adjusted positions.

SUMMARY OF THE PRESENT INVENTION

The visor embodying the present invention includes a visor body receiving a longitudinally extending pivot rod to which there is mounted a visor control comprising, in a preferred embodiment, a generally U-shaped resilient clamp surrounding the pivot rod. A cam is coupled to the clamp and includes an actuating lever for selectively operating the clamp for releasing the pivot rod from the clamp allowing the visor body to slide longitudinally with respect to the pivot rod. In a preferred embodiment of the invention, the clamp is made of a resilient polymeric material having a cylindrical aperture adjacent its closed end for lockably receiving the pivot rod therein. Extending between the legs of the generally U-shaped clamp is a L-shaped cam rod having a flat extending between the legs such that they remain in a fully closed, clamped position while locking the visor body with respect to the pivot rod. The cam rod can be rotated by the actuation of a lever coupled thereto for rotating the cam rod, spreading the legs of the U-shaped clamp apart for releasing the visor rod. The resilient legs of the clamp serve to hold the clamp in a normal locking position such that the operator can easily adjust the visor rod by depressing an actuating lever, sliding the visor to the desired position and releasing the lever for locking the visor in its adjusted position.

In one preferred embodiment of the invention, the cam comprises a generally elongated L-shaped rod which is mounted within the visor body to rotate in a radial direction. The actuating lever is mounted to the short leg of the L-shaped rod and extends outwardly adjacent an end of the visor distal from the pivot rod connection to the vehicle. With such structure, therefore, a longitudinally adjustable visor is provided which can be easily adjusted with the depression of an actuating lever to free the visor for adjustment and subsequent releasing of the lever locking the visor in the longitudinally adjusted position. The lever can be easily accessed with the visor in either the front windshield position or the side window position and, preferably, is conveniently located at an end of the visor body.

These an other features, objects and advantages of the present invention will become apparent upon reading the following description thereof together with reference to the accompanying drawings.

DETAILED DESCRIPTION OF THE PREFERRED EMBODIMENT

Figure 1:
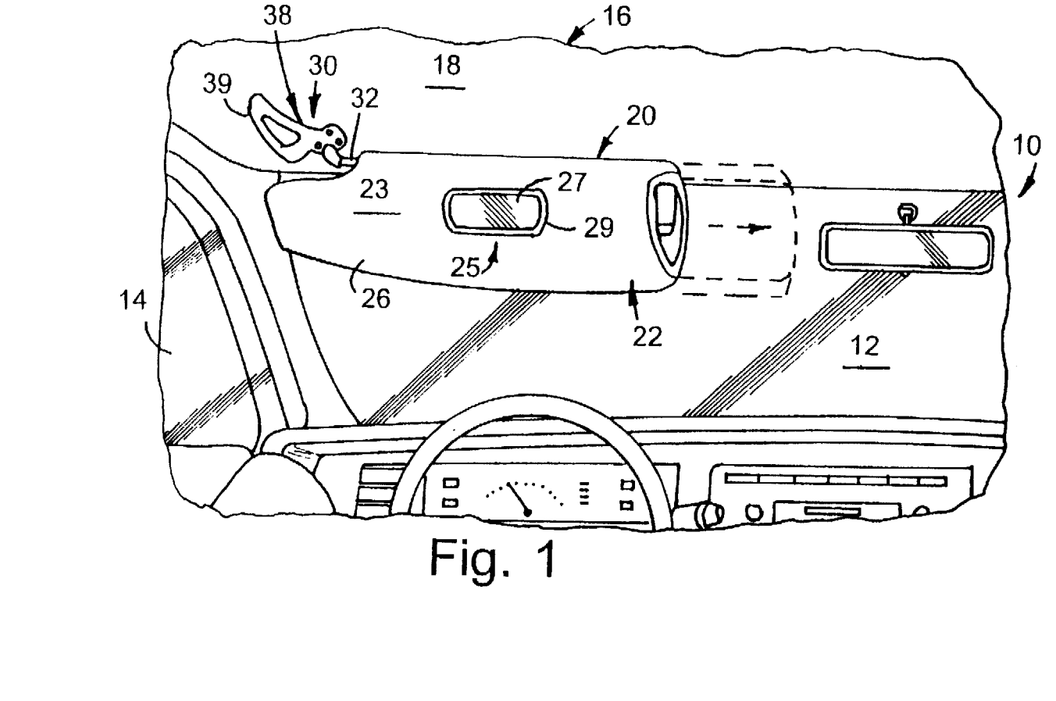
FIG. 1 is a fragmentary, perspective view of a vehicle including a visor embodying the present invention, shown in a front windshield position, partly shown in phantom form illustrating the adjustability of the visor.
Figure 2:
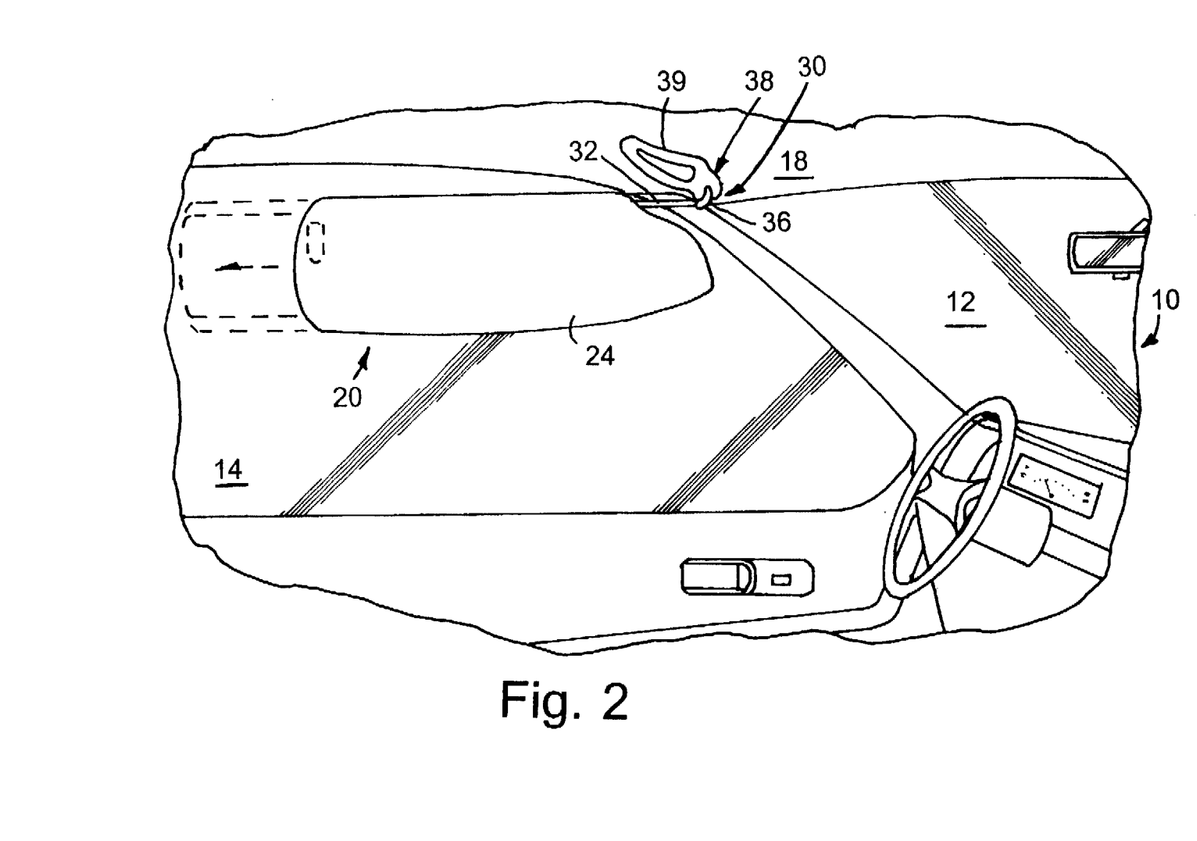
FIG. 2 is a fragmentary, perspective view of the visor shown in FIG. 1, shown moved to a side window position in the vehicle and shown partly in phantom form.
Figure 3:
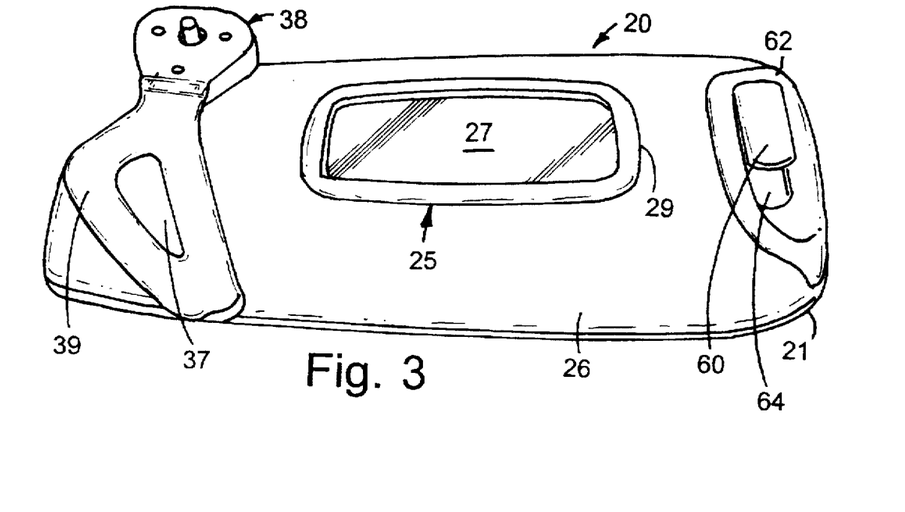
FIG. 3 is a perspective view of a visor embodying the present invention.

Referring initially to FIGS. 1 and 2, there is shown a vehicle 10, such as an automobile having a front windshield 12, a driver's side window 14 and a roof 16 including underlying sheet metal support structure for receiving the visor 20 of the present invention. Roof 16 is typically covered by an integrally molded headliner 18 having an upholstered surface facing the interior of the vehicle. In some embodiments, the visor 20 may be assembled directly to the headliner 18. In other embodiments, the visor will be secured to the underlying sheet metal of the vehicle roof. The visor 20 shown is mounted to the driver's side of the vehicle, although a similar visor of mirror image construction can be provided for the passenger side as well.

Visor 20 includes a visor body 22 preferably of a butterfly construction molded of a suitable polymeric material such as polypropylene and, thus, having front 26 and rear 24 sides. The rear side 24 is shown in the fragmentary views of FIGS. 5 and 6 for the sake of illustrating the control mechanism. The control mechanism allows the visor 20 to be moved to longitudinally adjusted positions along its visor pivot rod 32, as illustrated in phantom lines in FIGS. 1 and 2. This folded butterfly polymeric visor body construction is generally commercially available and is represented by, for example, the structure disclosed in U.S. Pat. No. 4,763,946, with respect to the visor body itself. The front and rear sides 26, 24, respectively, of the visor body are suitably covered by an upholstery material 23 conforming the visor's appearance to that of the vehicle interior. Mounted within the front side 26 of visor 20 is a vanity mirror assembly 25 which includes a mirror 27 and mirror frame 29. If desired, the vanity mirror assembly 25 may also include illumination for use of the vanity mirror in low ambient light conditions.

Figure 6:
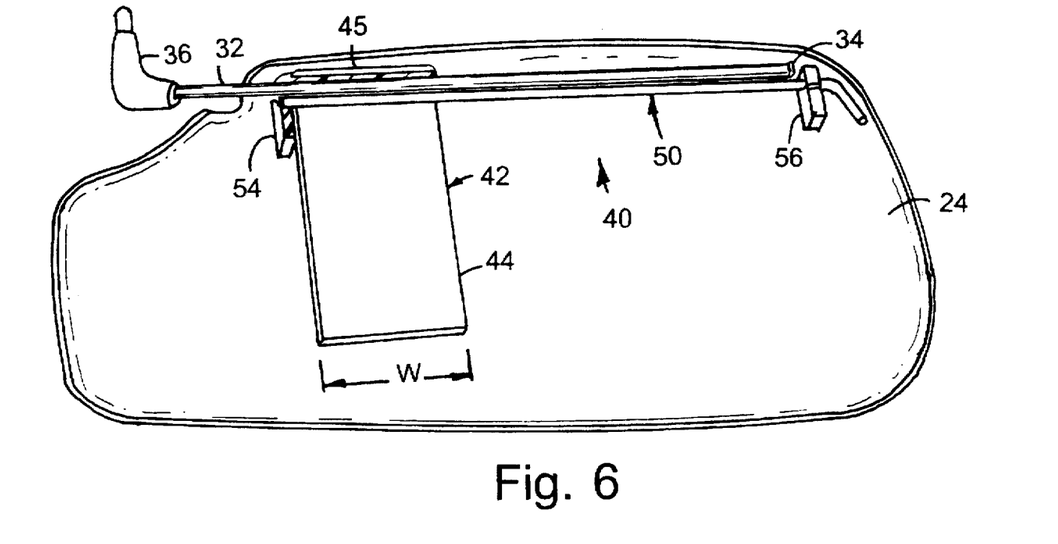
FIG. 6 is a perspective view, partly broken away, of the rear half of the visor body showing the control mechanism therefor, with the visor shown in a fully collapsed position on the visor rod.
Figure 7:
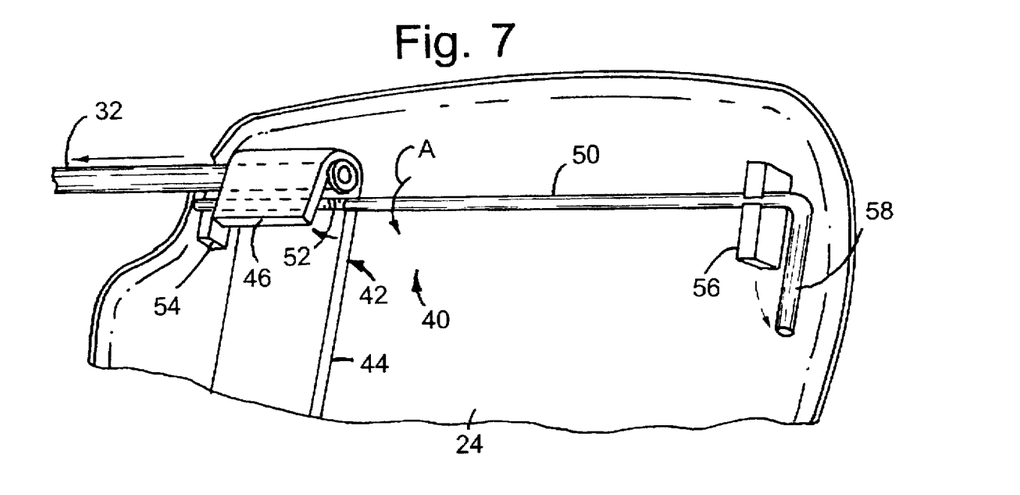
FIG. 7 is a fragmentary, perspective view of the visor shown in FIG. 6, shown with the visor moved to its fully extended position on the visor rod.

The visor 20 is mounted to the vehicle by a visor pivot rod assembly 30, which is best seen in FIGS. 1–3 and 6 and which includes an elongated hollow cylindrical pivot rod 32 extending substantially the length of the visor body, as seen in FIG. 6, and including a cap 34 at its end preventing the visor body from being removed from the pivot rod 32. The opposite end of pivot rod 32 is coupled to an elbow bracket 36 having an end which fits within a molded polymeric mounting bracket 38 (FIGS. 1, 2 and 3) which may integrally include a generally triangular map receiving storage clip 39 conveniently located above the visor 20. Clip 39 is of contemporary design having a generally smooth triangular configuration with an open window 37 to reduce material cost, increase its resiliency and provide a trim yet functional design. Bracket 38 and integral clip 39 may be molded of a suitable polymeric material such as ABS or polycarbonate.

Elbow 36 fits within an aperture in mounting bracket 38 in a conventional manner to allow the visor to pivot from the front windshield position shown in FIG. 1 to the side window position shown in FIG. 2 with a predetermined rotational torque. The visor rod 32, in the preferred embodiment of the invention, extends continuously through elbow 36 such that rotation of the visor body 22, with respect to pivot rod 32, is accomplished by the internal visor control 40 now described in connection with FIGS. 5–11.

Visor control 40 allows the visor 20 to slide along pivot rod 32 as well as rotate between a raised stored position against the headliner 18 to lowered use positions, as seen in FIGS. 1 and 2. The visor control 40 comprises a generally U-shaped resilient polymeric clamp 42 which is controlled by a cam 50. Cam 50 comprises a generally L-shaped rod having a flat 52 at one end which extends between legs 44 and 46 of clamp 42, as best seen in FIGS. 8–11, such that when the rod-shaped cam 50 is rotated as indicated by arrow A in the figures, resilient legs 44 and 46 are spread apart to release the visor pivot rod 32.

Figure 8:
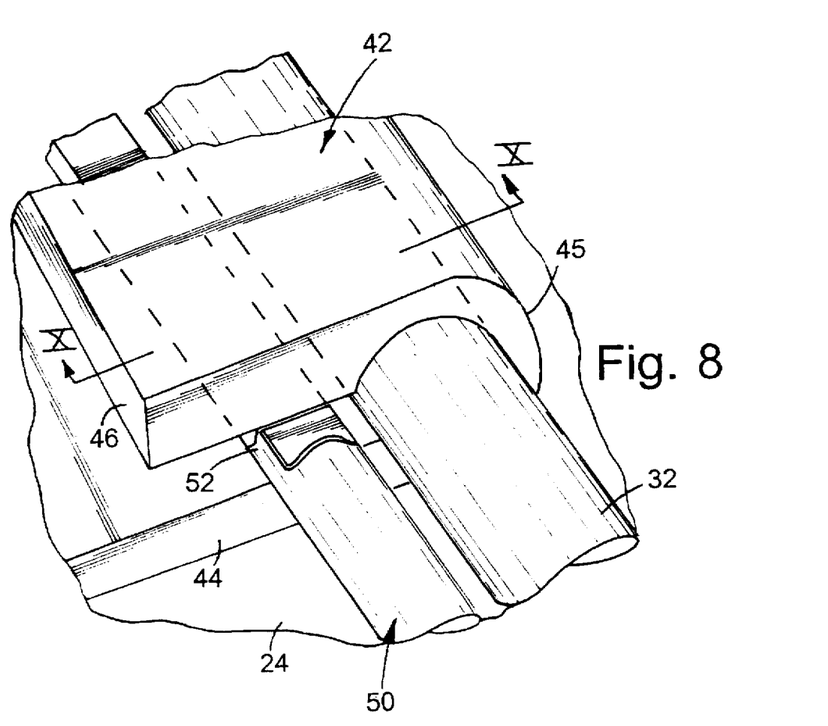
FIG. 8 is an enlarged fragmentary, perspective view of the visor control for the adjustable visor of the present invention shown in a locked position.
Figure 9:
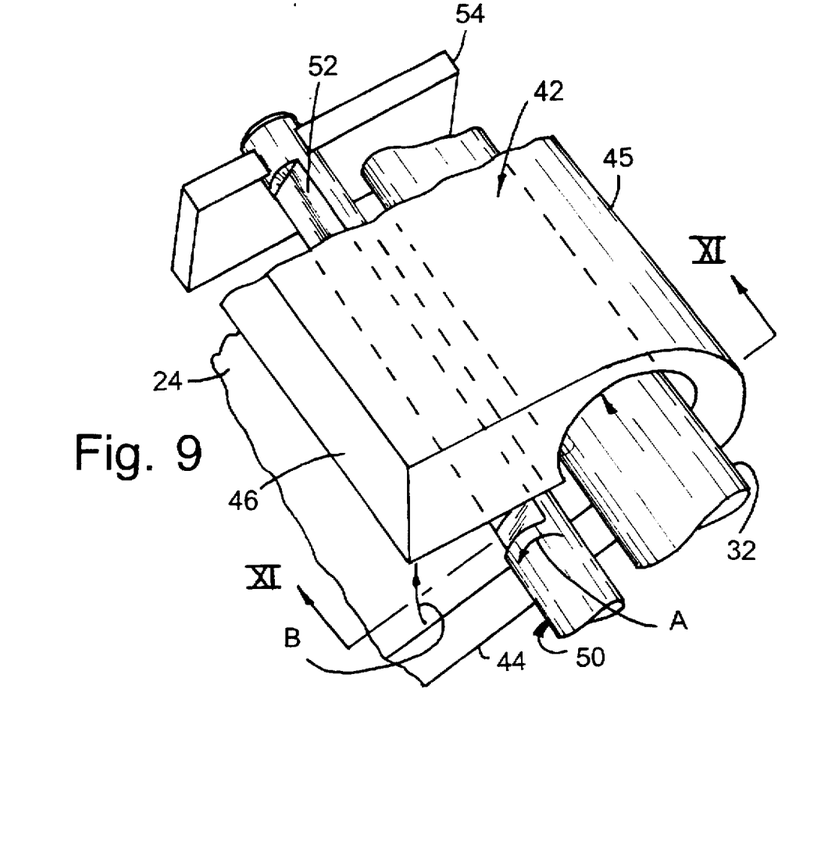
FIG. 9 is a fragmentary, perspective view of the structure shown in FIG. 8, showing the control in an unlocked position freeing the visor for movement.
Figure 10:
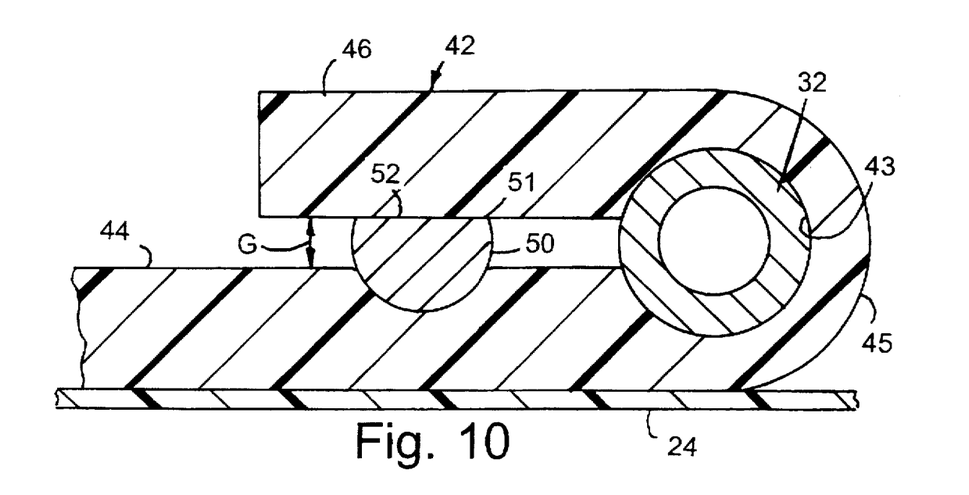
FIG. 10 is a greatly enlarged cross-sectional view of the structure shown in FIG. 8, taken along section lines X—X of FIG. 8.
Figure 11:
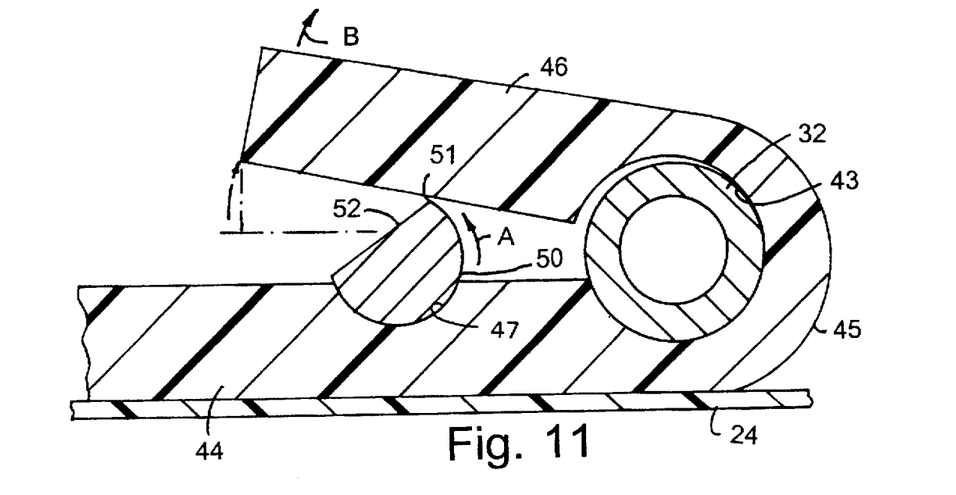
FIG. 11 is a greatly enlarged, fragmentary, cross-sectional view of the structure shown in FIG. 9, taken along section lines XI—XI of FIG. 9.

The cam rod 50 is supported at opposite ends by snap-fitting within mounting bosses 54, 56, which, in turn, are secured to visor core half or rear side 24. Clamp 42 is integrally formed of a suitable polymeric material such as Delrin® or a glass reinforced nylon having sufficient strength to securely grip the visor rod 32 when in a clamped position, as seen in FIGS. 8 and 10. For such purpose, the clamp 42 includes a generally cylindrical aperture 43 having a diameter slightly smaller than the outer diameter of pivot rod 32 such that the pivot rod can be extended within the clamp only when in an open position, as illustrated in FIG. 11. Aperture 43 is immediately adjacent the closed end 45 of clamp 42. Leg 44 includes a semicylindrical recess 47 for receiving the cylindrical cam rod 50 and cradling the cam rod therein to allow it to be rotated as indicated in FIGS. 10 and 11 and remain in relative alignment with clamp 42 when it undergoes the significant forces necessary to release the visor rod during actuation of cam 50. The clamp 42 in the preferred embodiment had a thickness for each of the legs 44, 46, which are integral with end 45, of approximately three eighths of an inch; and a width W (FIG. 6) of approximately two inches to provide the desired holding force and torque for the desired movement of the visor about the axis of pivot rod 32 for raising and lowering the visor between a raised stored position and a lowered use position without requiring actuation of cam 50.

Cam 50, as indicated above, is a generally L-shaped rod with a short or base leg 58 remote from clamp 42 and positioned near the free end 21 of visor 20. As seen in FIG. 5, end 58 defines an actuating lever which is encapsulated by an actuating member 60 comprising a polymeric lever extension surrounded by a decorative bezel 62 having a recess 64 therein for allowing the actuating lever 58 to rotate the cam 50 from the clamped position shown in FIGS. 4 and 5 in the direction indicated by arrow A in FIG. 5. This rotates rod 50, as indicated by arrow A in FIG. 11, and leg 46 of clamp 42, in an opposite direction indicated by arrow B in FIGS. 5 and 11, to release the visor rod allowing the visor to slide longitudinally along pivot rod 32. The polymeric clamp 42 allows the relatively smooth sliding motion of the visor 20 along pivot rod 32 due, in part, to the lubricous polymeric aperture 43 of the clamp 42 and the unique hand release mechanism for freeing the pivot rod from the clamp. Clamp 42 is secured to wall 24 of the visor body 22 by means of bonding the facing surface of leg 44 to the inside surface of visor side 24 or by suitable fastening means such as rivets, screws or the like. Leg 44 is significantly longer than leg 46 to allow the stable mounting of clamp 42 to the visor body. As best seen in FIGS. 10 and 11, the diameter of cam 50 is selected such that the corner 51, which is somewhat rounded, when rotated increases the effective dimension of rod 50, which extends between the gap G (FIG. 10) and spreads the facing surfaces of legs 44 and 46 a distance sufficient to open the aperture 43 of clamp 42, as seen in FIG. 11, freeing the visor rod from the clamp for slidable motion.

Figure 4:
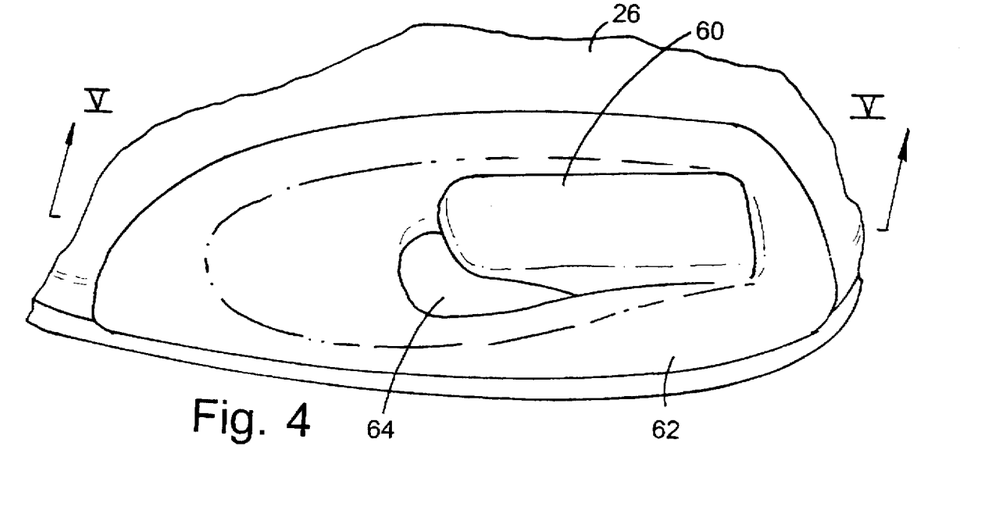
FIG. 4 is an enlarged, fragmentary right end perspective view of the actuating member for the visor of the present invention.
Figure 5:
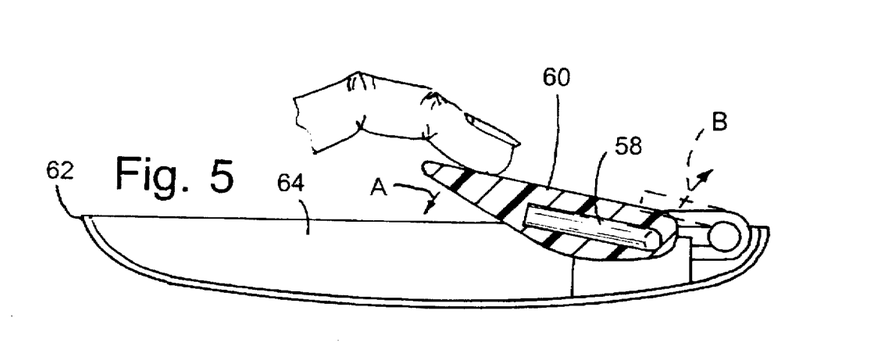
FIG. 5 is a cross-sectional view of the actuating member taken along section lines V—V of FIG. 4.

The bias force of legs 44 and 46 tending to remain in their stable, at rest position, as seen in FIG. 10, also serves to urge the cam 50 into the position shown in FIGS. 1, 4, 5 and 10 with the actuator 58 in a raised position, as illustrated in FIGS. 4 and 5. Thus, the visor control also serves as a spring for the actuating member 60 returning it to its stationary position with the clamp in its clamping position, shown in FIGS. 8 and 10. To move the visor, the operator merely grips the visor and, using thumb pressure, compresses the actuator 60, thereby releasing the clamp. The actuator 60 extends the leverage available to the operator such that the pivot rod is relatively easily released. Further, the actuator 60 can be accessed with the visor either in the position shown in FIG. 1 or FIG. 2 by compressibly gripping end 21 of the visor from either side of the visor.

Other actuating means for providing a force between the facing surfaces of legs 44 and 46 of clamp 42 may be provided; however, the elongated, generally L-shaped cam rod provides a convenient and easily controlled actuator for the sliding visor of the present invention. It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A sliding visor comprising:
   a visor body including a generally U-shaped resilient clamp mounted within said body, said clamp including a pair of legs joined at a closed end to form a generally cylindrical aperture for receiving a longitudinally extending pivot rod therein, said cylindrical aperture positioned adjacent said closed end of said clamp;
   a pivot rod having one end extending from said visor body for mounting to a vehicle and an elongated end extending through said aperture of said clamp; and
   cam means extending in parallel relationship to said pivot rod and engaging said legs of said clamp for forcing said legs of said clamp apart to release said visor pivot rod for allowing the visor body to move longitudinally along said pivot rod.

2. The visor as defined in claim 1 wherein said cam means comprises a rotatable cam.

3. A sliding visor comprising:
   a visor body including a generally U-shaped resilient clamp mounted within said body, said clamp including a pair of legs joined at a closed end to form a generally cylindrical aperture for receiving a longitudinally extending pivot rod therein, said cylindrical aperture positioned adjacent said closed end of said clamp;
   a pivot rod having one end extending from said visor body for mounting to a vehicle and an elongated end extending through said aperture of said clamp; and
   a rotatable cam engaging said legs of said clamp for forcing said legs of said clamp apart to release said visor pivot rod for allowing the visor body to move longitudinally along said pivot rod wherein said rotatable cam comprises a cam rod extending in generally parallel relationship to said pivot rod of said visor and means for rotatably mounting said cam rod to said visor body.

4. The visor as defined in claim 3 wherein said cam rod comprises a generally L-shaped member having a base leg of said L-shaped member defining an actuator for said cam rod.

5. The visor as defined in claim 4 wherein one leg of said clamp includes a semicylindrical slot defining a cradle for supporting said cam rod in said clamp.

6. The visor as defined in claim 5 wherein said cam rod includes a flat which aligns with an opposite leg of said clamp from said cradle when said clamp is in a closed clamping position with respect to said pivot rod.

7. The visor as defined in claim 6 wherein said visor further includes a bezel and said base leg extends through said bezel and is covered by an extension lever for actuation of said cam rod.

8. The visor as defined in claim 7 wherein said cradle is spaced from said cylindrical aperture through said clamp.

9. The visor as defined in claim 1 wherein said clamp is made of a lubricous polymeric material.

10. The visor as defined in claim 9 wherein one of said legs of said clamp is longer than the other and is mounted to said visor body for fixedly supporting said clamp to said visor body.

11. The visor as defined in claim 1 wherein said pivot rod includes a cap at an end of said elongated end to prevent said visor body from being removed from said pivot rod.

12. A sliding visor comprising:
   a visor body including a generally U-shaped resilient clamp mounted within said body, said clamp including a pair of legs joined at a closed end to form a generally cylindrical aperture for receiving a longitudinally extending pivot rod therein, said cylindrical aperture positioned adjacent said closed end of said clamp;
   a pivot rod having one end extending from said visor body for mounting to a vehicle and an elongated end extending through said aperture of said clamp;
   cam means engaging said legs of said clamp for forcing said legs of said clamp apart to release said visor pivot rod for allowing the visor body to move longitudinally along said pivot rod; and
   a visor mounting bracket for receiving said one end of said pivot rod and for mounting said visor body to a vehicle, said bracket including a storage clip.

13. The visor as defined in claim 12 wherein said storage clip is integral with said bracket and has a generally triangular shape with a central opening.

14. A sliding visor comprising:
   a visor body including a visor control mounted within said body, said control including a generally cylindrical aperture of selectable dimensions for receiving and selectively holding a longitudinally extending pivot rod therein;
   a pivot rod extending through said aperture and including an end extending from said visor body for mounting to a vehicle; and
   cam means extending in parallel spaced relationship to said pivot rod and engaging said visor control to change the dimension of said aperture of said visor control to selectively release said visor pivot rod for allowing the visor body to move longitudinally along said pivot rod.

15. The visor as defined in claim 14 wherein said control comprises a U-shaped resilient polymeric clamp having a pair of legs extending from the sidewall of said cylindrical aperture for selectively opening and closing said aperture.

16. The visor as defined in claim 15 wherein said engaging means separates said legs of said clamp.

17. A sliding visor comprising:
   a visor body including a visor control mounted within said body, said control including a generally cylindrical aperture of selectable dimensions for receiving and selectively holding a longitudinally extending pivot rod therein wherein said control comprises a U-shaped resilient polymeric clamp having a pair of legs extending from the sidewall of said cylindrical aperture for selectively opening and closing said aperture;
   a pivot rod extending through said aperture and including an end extending from said visor body for mounting to a vehicle; and
   means engaging said visor control to separate said legs of said clamp to change the dimension of said aperture of said visor control to selectively release said visor pivot rod for allowing the visor body to move longitudinally along said pivot rod, wherein said engaging means comprises a cam rod extending in generally parallel relationship to said pivot rod of said visor and rotatably mounted to said visor body.

18. The visor as defined in claim 17 wherein said cam rod comprises a generally L-shaped member with a base leg of said L-shaped member extending from said visor body for defining an actuator for said cam rod.

19. The visor as defined in claim 18 wherein one leg of said clamp includes a semicylindrical slot defining a cradle for supporting said cam rod in said clamp.

20. The visor as defined in claim 19 wherein said cam rod includes a flat which aligns with an opposite leg of said clamp from said cradle when said clamp is in a closed clamping position with respect to said pivot rod.

21. The visor as defined in claim 20 wherein said visor body further includes a bezel and said actuating member extends through said bezel and is covered by an extension lever for actuation of said cam rod.

22. The visor as defined in claim 21 wherein said clamp is made of a lubricous polymeric material.

23. The visor as defined in claim 22 wherein one of said legs of said clamp is longer than the other and is mounted to said visor body for fixedly supporting said clamp to said visor body.

24. A visor comprising:

a visor body;

a visor pivot rod; and a visor control for mounting said visor body to said pivot rod, said visor control comprising a resilient clamp having a generally cylindrical aperture for receiving said pivot rod, said clamp including a wall with a longitudinally extending recess, said clamp further including a movable leg and an operator-actuated cam extending in said recess and in parallel relationship to said pivot rod for selectively moving said movable leg to selectively release said visor body from said pivot rod allowing said visor body to move with respect to said visor rod.

25. The visor as defined in claim 24 wherein said pivot rod is elongated and said visor body can be slideably adjusted along the length of said visor pivot rod when said cam releases said visor body from said pivot rod.

26. The visor as defined in claim 25 wherein said cam comprises a rotatable cam.

27. A visor comprising:

a visor body;

a visor pivot rod; and a visor control for mounting said visor body to said pivot rod, said visor control comprising a resilient clamp having a generally cylindrical aperture for receiving said pivot rod, said clamp including a wall with a longitudinally extending recess, said clamp further including a movable leg and an operator-actuated rotatable cam extending in said recess for selectively moving said movable leg to selectively release said visor body form said pivot rod allowing said visor body to move with respect to said visor rod, wherein said pivot rod is elongated and said visor body can be slideably adjusted along the length of said visor pivot rod when said cam releases said visor body from said pivot rod, and wherein said rotatable cam comprises a cam rod extending in generally parallel relationship to said pivot rod of said visor and means for rotatably mounting said cam rod to said visor body.

28. The visor as defined in claim 27 wherein said cam rod comprises a generally L-shaped member with the base leg of said L-shaped member defining an actuator for said cam rod.

29. The visor as defined in claim 28 wherein said clamp is generally U-shaped and said recess is a semicylindrical slot defining a cradle for supporting said cam rod in said clamp.

30. The visor as defined in claim 29 wherein said cam rod includes a flat which aligns with said movable leg of said clamp when said clamp is in a closed clamping position with respect to said pivot rod.

31. The visor as defined in claim 30 wherein said visor further includes a bezel and said base leg extends through said bezel and is covered by an extension lever for actuation of said cam rod.

* * * * *